(12) United States Patent
Tamatsu

(10) Patent No.: US 6,320,531 B1
(45) Date of Patent: Nov. 20, 2001

(54) FM-CW RADAR SYSTEM FOR MEASURING DISTANCE TO AND RELATIVE SPEED OF TARGET

(75) Inventor: Yukimasa Tamatsu, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/709,351

(22) Filed: Nov. 13, 2000

(30) Foreign Application Priority Data

Dec. 9, 1999 (JP) .................................................. 11-350073

(51) Int. Cl.[7] .......................... G01S 13/536; G01S 13/93
(52) U.S. Cl. ........................... 342/109; 342/70; 342/111; 342/115; 342/128; 342/192; 342/196
(58) Field of Search .................................. 342/70, 71, 72, 342/87, 99, 109, 111, 114, 115, 116, 128, 129, 130, 131, 132, 135, 192, 196

(56) References Cited

U.S. PATENT DOCUMENTS

| | | | |
|---|---|---|---|
| 5,619,208 | 4/1997 | Tamatsu et al. | 342/70 |
| 5,731,778 | 3/1998 | Nakatani et al. | 342/70 |
| 5,751,240 | 5/1998 | Fujita et al. | 342/70 |
| 5,757,307 | 5/1998 | Nakatani et al. | 342/70 |
| 5,905,458 * | 5/1999 | Ashihara | 342/70 |
| 5,963,162 * | 10/1999 | Mochizuki et al. | 342/70 |
| 5,982,321 * | 11/1999 | Iihoshi et al. | 342/158 |
| 6,040,796 | 3/2000 | Matsugatani et al. | 342/70 |
| 6,121,917 * | 9/2000 | Yamada | 342/128 |
| 6,140,954 * | 10/2000 | Sugawara et al. | 342/70 |
| 6,198,426 * | 3/2001 | Tamatsu et al. | 342/70 |
| 6,229,474 * | 5/2001 | Uehara | 342/70 |
| 6,246,357 * | 6/2001 | Uehara | 342/70 |

FOREIGN PATENT DOCUMENTS

| | | |
|---|---|---|
| 4-309883 | 11/1992 | (JP) . |
| 4-315080 | 11/1992 | (JP) . |
| 5-50383 | 7/1993 | (JP) . |
| 6-207979 | 7/1994 | (JP) . |
| 8-262130 | 10/1996 | (JP) . |
| 9-133765 | 5/1997 | (JP) . |
| 9-152477 | 6/1997 | (JP) . |
| 9-152478 | 6/1997 | (JP) . |
| 9-222474 | 8/1997 | (JP) . |
| 11-30663 | 2/1999 | (JP) . |

\* cited by examiner

Primary Examiner—John B. Sotomayor
(74) Attorney, Agent, or Firm—Law Office of David G. Posz

(57) ABSTRACT

An FM-CW radar is provided which may be employed in anti-collision systems or cruise control systems installed in moving objects such as automotive vehicles. The radar analyzes a beat signal in frequency to produce peak frequency components in a modulated frequency-rising range wherein the frequency of a frequency-modulated radar wave transmitted from the radar increases and a modulated frequency-falling range wherein the frequency of the radar wave decreases. If one of peak frequency pairs, each of which is made up of each of the peak frequency components in the modulated frequency-rising range and one of the peak frequency components in the modulated frequency-falling range, lies within a given lower frequency range, the radar identifies the one of the peak frequency pairs as radar data arising from a moving object appearing suddenly in a radar detection zone.

8 Claims, 7 Drawing Sheets

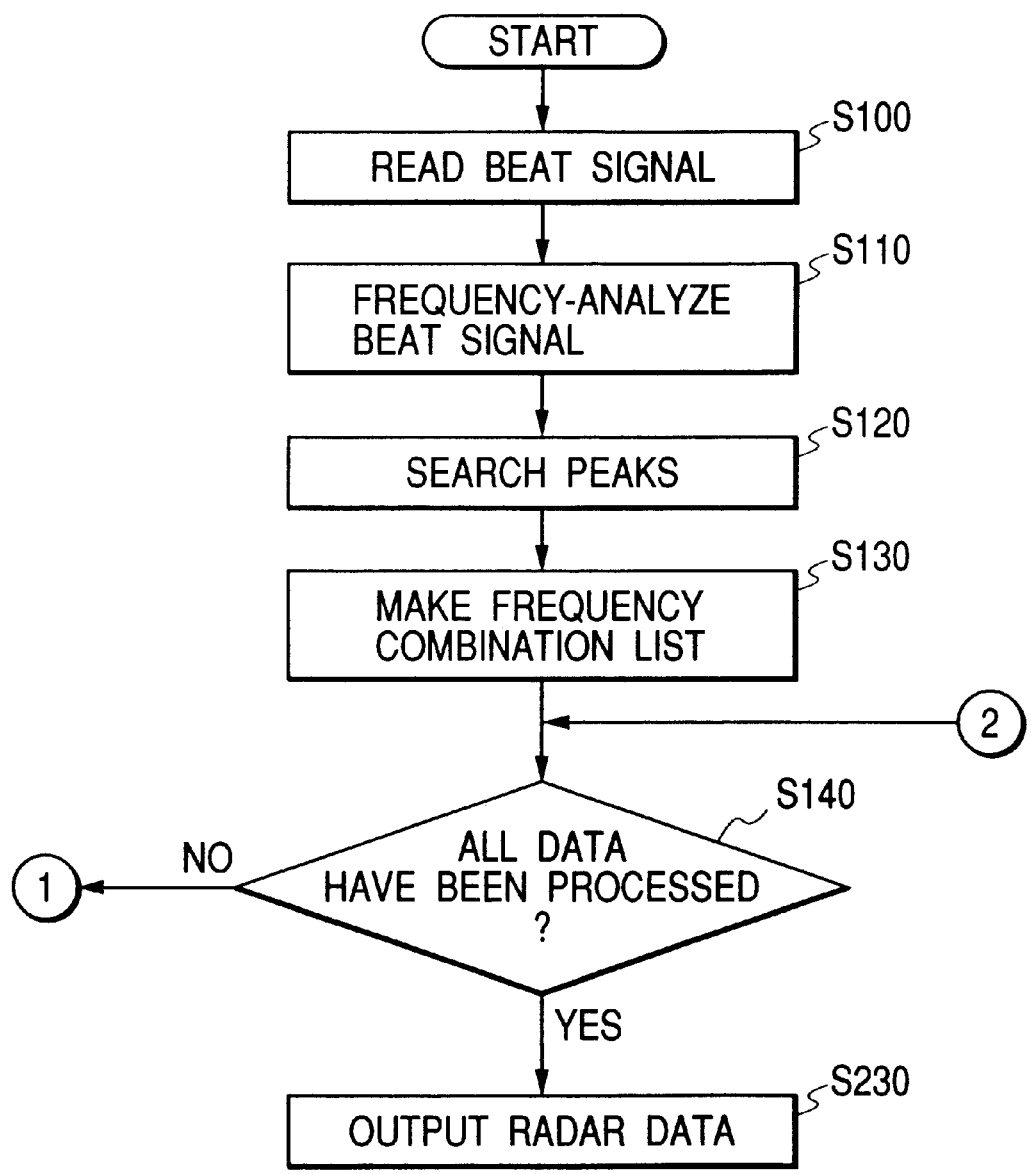

| | f-RISING RANGE PEAK | | |
|---|---|---|---|
| | 1 | 2 | 3 |
| A | 1-A | 2-A | 3-A |
| B | 1-B | 2-B | 3-B |
| C | 1-C | 2-C | 3-C |

(f-FALLING RANGE PEAK)

FM-CW RADAR SYSTEM FOR MEASURING DISTANCE TO AND RELATIVE SPEED OF TARGET

BACKGROUND OF THE INVENTION

1 Technical Field of the Invention

The present invention relates generally to an FM-CW radar apparatus which may be employed in anti-collision systems or cruise control systems installed in moving objects such as automotive vehicles and which is designed to transmit a frequency-modulated radar wave and receive a return of the radar wave from a target object to determine the distance to and relative speed of the target object.

2 Background Art

Recently, radars are used in automotive vehicles to measure the distance to and relative speed of an object present ahead of the vehicle. As one of such radars, an FM-CW (frequency modulated-continuous wave) radar is now proposed which is designed to transmit a radar wave which is frequency-modulated with a triangular wave to have a frequency increasing and decreasing cyclically, receive a radar return of the transmitted radar wave from a target, and mix the received radar wave with the transmitted one to produce a beat signal. The frequency of the beat signal (referred to as a beat frequency below) is determined using a signal processor in each of ranges wherein the frequency of the transmitted radar wave increases and decreases. The frequency of the beat signal in the range wherein the frequency of the transmitted radar wave increase will be referred to as a rising beat frequency, and that range will be referred to as a modulated frequency rising range. Similarly, the frequency of the beat signal in the range wherein the frequency of the transmitted radar wave decreases will be referred to as a falling beat frequency, and that range will be referred to as a modulated frequency falling range. If the rising beat frequency is defined as fb1, and the falling beat frequency is defined as fb2, the distance D to and relative speed V of a target may be expressed by the equations (1) and (2) below.

$$D=(C/(8 \cdot \Delta F \, fm)) \cdot (fb1+fb2) \quad (1)$$

$$V=(C/(4 \cdot f0)) \cdot (fb2-fb1) \quad (2)$$

where $\Delta F$ is a variation in frequency of the transmitted radar wave, f0 is the central frequency of the transmitted radar wave, 1/fm is the time required for modulation in one cycle (i.e., fm is the frequency of the triangular wave used in modulating the transmitted radar wave), and C is the velocity of light.

FIGS. 4(a) and 4(b) show frequency relations between a signal T transmitted from the FM-CW radar and a signal R received by the FM-CW radar.

FIG. 4(a) illustrates for the case where a moving object equipped with the FM-CW radar and a target are identical in speed with each other, that is, where the relative speed V of the moving object to the target is zero (0). Usually, a return of a radar wave from a target undergoes a delay of time the radar wave takes to travel from the radar to the target and back. Thus, the received signal R is, as shown in the drawing, shifted in phase from the transmitted signal T along a time axis so that the rising beat frequency fb1 will be, as shown in FIG. 4(a), equal in peak level to the falling beat frequency fb2.

FIG. 4(b) illustrates for the case where a moving object equipped with the FM-CW radar and a target are different in speed from each other, that is, where the relative speed V of the moving object to the target is not zero. In this case, the received signal R is further doppler-shifted in frequency as a function of the relative speed V so that the received signal R is shifted in frequency from the transmitted signal T, which will cause, as shown in FIG. 4(d), the rising beat frequency fb1 to be different in peak level from the falling beat frequency fb2.

The determination of the distance D to and relative speed V of the target may, thus, be accomplished with use of the above relations between the rising beat frequency fb1 and the falling beat frequency fb2.

However, in practical use, the radar usually detects a plurality of targets and produces as many peak frequencies as the targets in each of the modulated frequency-rising and -falling ranges. Particularly, when the speed of the radar is different from those of the targets, the rising beat frequency fb1 and the falling beat frequency fb2 show, as described above, different peak levels because of the doppler shift. Therefore, when a plurality of peak frequencies are detected, as described above, in each of the modulated frequency-rising and -falling ranges, pairing each of the peak frequencies in the modulated frequency-rising range and one of the peak frequencies in the modulated frequency-falling range in a simple manner will result in difficulty in determining the distance D to and the relative speed V of each target accurately.

U.S. Pat. No. 5,619,208 issued on Apr. 8, 1997, assigned to the same assignee of this application teaches an FM-CW radar system designed to avoid the above problem. This system combines each of peak frequencies in the modulated frequency-rising range with one of peak frequencies in the modulated frequency-falling range to produce a peak frequency pair and determines an estimate thereof which may be expected to appear a given time later. If the estimated peak frequency pair is close to a corresponding pair of peak frequencies which have appeared in the modulated frequency-rising and -falling ranges actually the given time later, the system determines the estimated peak frequency pair as a correct peak frequency pair and derive data on the target using it.

The above system, however, has the drawback in that the selection of the estimated peak frequency pairs as the correct peak frequencies consumes much time, thus resulting in delay in outputting data on each target and is unuseful for the case where there is a moving object such as a vehicle nipping in front of a system-equipped vehicle suddenly which needs to be identified quickly.

SUMMARY OF THE INVENTION

It is therefore a principal object of the present invention to avoid the disadvantages of the prior art.

It is another object of the present invention to provide an FM-CW radar apparatus designed to detect a target with high accuracy which appears suddenly in a radar range such as a vehicle nipping in front of a radar-equipped vehicle.

According to one aspect of the invention, there is provided an FM-CW radar apparatus for a vehicle which may be employed in anti-collision systems or cruise control systems to derive radar data such as the distance to and relative speed of a target. The FM-CW radar apparatus comprises: (a) a radar wave transmitter transmitting a radar wave having a frequency modulated so as to increase at a given rate and decrease at a given rate cyclically; (b) a radar wave receiver receiving a return of the radar wave from a target object present in a radar detection zone to mix the return of the radar wave with the radar wave transmitted from the radar wave transmitter to produce a beat signal; (c)

a peak frequency component producing circuit analyzing the beat signal in frequency to produce peak frequency components in a modulated frequency-rising range wherein the frequency of the radar wave transmitted from the radar wave transmitter increases and a modulated frequency-falling range wherein the frequency of the radar wave decreases; and (d) a radar data producing circuit producing radar data, if one of peak frequency pairs, each of which is made up of each of the peak frequency components in the modulated frequency-rising range and one of the peak frequency components in the modulated frequency-falling range, lies within a given lower frequency range, the radar producing circuit identifying the one of the peak frequency pairs as the radar data arising from a moving object appearing suddenly in the radar detection zone.

In the preferred mode of the invention, the radar data producing circuit uses each of the peak frequency pairs to estimate a peak frequency pair cyclically which is expected to appear a given time later. If the estimated peak frequency pair and a corresponding peak frequency pair which has derived actually the given time later are close to each other within a given frequency range, the radar data producing circuit determines the estimated peak frequency pair and the corresponding peak frequency pair as arising from the same object.

When the peak frequency pair lying within the given lower frequency range has been detected, the radar data producing circuit removes some of the peak frequency pairs containing at least one of the peak frequency components of the peak frequency pair lying within the given lower frequency range and uses only the remaining peak frequency pairs to estimate peak frequency pairs which are expected to appear at the given time later.

The given lower frequency range is so set that the only one pair of peak frequency component is allowed to be fall within the given lower frequency range.

The given lower frequency range may be set as a function of a speed of the FM-CW radar apparatus.

The given lower frequency range may be provided when a speed of the FM-CW radar is greater than a given value.

When a difference in level between one of the peak frequency components in the modulated frequency-rising range and one of the peak frequency components in the modulated frequency-falling range is smaller than a given value, the radar data producing circuit combines them to produce one of the peak frequency pairs.

According to another aspect of the invention, there is provided an FM-CW radar apparatus for a vehicle which comprises: (a) a radar wave transmitter transmitting a radar wave having a frequency modulated so as to increase at a given rate and decrease at a given rate cyclically; (b) a radar wave receiver receiving a return of the radar wave from a target object present in a radar detection zone to mix the return of the radar wave with the radar wave transmitted from the radar wave transmitter to produce a beat signal; (c) a peak frequency component producing circuit analyzing the beat signal in frequency to produce peak frequency components in a modulated frequency-rising range wherein the frequency of the radar wave transmitted from the radar wave transmitter increases and a modulated frequency-falling range wherein the frequency of the radar wave decreases; (d) a combining circuit combining each of the peak frequency components in the modulated frequency-rising range with one of the peak frequency components in the modulated frequency-falling range to produce a peak frequency pair; and (e) a radar data outputting circuit, if one of the peak frequency pairs lies within a given lower frequency range, outputting only the one of the peak frequency pairs as radar data.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 5 and 6 show a flowchart of a program performed to derive radar data on a target;

DESCRIPTION OF THE PREFERRED EMBODIMENTS

Figure 1:
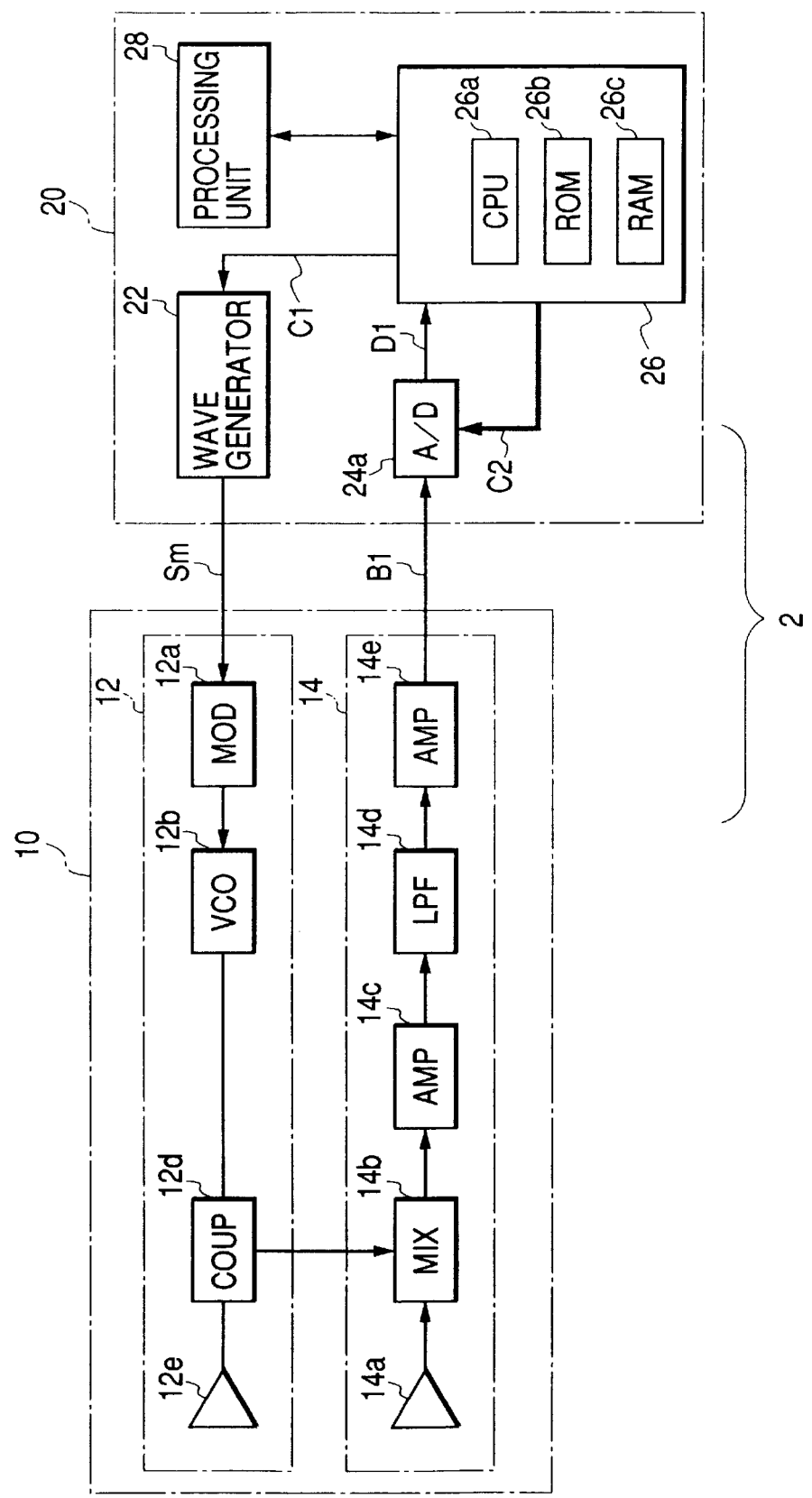
FIG. 1 is a block diagram which shows an FM-CW radar according to the present invention.

Referring now to the drawings, wherein like numbers refer to like parts in several views, particularly to FIG. 1, there is shown an FM-CW radar 2 which may be employed in performing anti-collision control and/or radar cruise control. The FM-CW radar 2 generally consists of a transceiver 10 and a signal processor 20. The transceiver 10 includes a transmitter 12 and a receiver 14. The transmitter 12 transmits a radar wave whose frequency is modulated with a modulating signal Sm. The receiver 14 receives a return of the radar wave from a reflective object present in a given detection zone and output a beat signal B1 having intermediate frequencies. The signal processor 20 provides the modulating signal Sm to the transmitter 12 and obtains data on the object using the beat signal B1.

In the following discussion, it is assumed that the radar 2 is mounted in an automotive vehicle (referred to as a system vehicle below) to detect an obstacle in front of the system vehicle, the transceiver 10 is installed on the front of the system vehicle, and the signal processor 20 is installed in or near a cabin.

The transmitter 12 includes a modulator 12a, a voltage-controlled oscillator (VCO) 12b, a power distributor (i.e., a coupler) 12d, and a transmitting antenna 12e. The modulator 12a adjusts the level of the modulating signal Sm to one for the voltage-controlled oscillator 12b. The voltage-controlled oscillator 12b produces a high-frequency signal in a millimeter wave band. The power distributor 12d splits in power the high-frequency signal to provide a local signal to the receiver 14. The transmitting antenna 12e radiates an output of the power distributor 12d as a radar wave.

The receiver 14 includes a receiving antenna 14a, a mixer 14b, a preamplifier 14c, a low-pass filter 14d, p and a post-amplifier 14e. The receiving antenna 14a receives a return of the radar wave transmitted from the transmitting antenna 12e. The mixer 14b mixes the received signal with the local signal inputted from the power distributor 12d and outputs it to the preamplifier 14c. The preamplifier 14c amplifies the output from the mixer 14b. The low-pass filter 14d removes unwanted high-frequency components from an output of the preamplifier 14c to produce the beat signal B1 having a frequency component corresponding to the difference in frequency between the transmitted signal and the received signal. The post-amplifier 14e amplifiers the beat signal B1 to a required level and output it to the signal processor 20.

The signal processor 20 consists of a triangular wave generator 22, an A/D converter 24a, a microcomputer 26, and an arithmetic processing unit 28. The triangular wave generator 22 is activated in response to a start signal C1 from the microcomputer 26 to generate the modulating signal Sm in the form of a triangular wave. The A/D converter 24a operates in response to a start signal C2 to convert the beat signal B1 inputted from the receiver 14 into a digital signal D1. The microcomputer 26 consists of a CPU 26a, a ROM 26b, and a RAM 26c and controls the triangular wave generator 22, the A/D converter 24a, and the arithmetic processing unit 28. The microcomputer 26 also determines the distance to and relative speed and azimuth or angular direction of a target based on the digital signal D1. The arithmetic processing unit 28 is response to a command signal from the microcomputer 26 to perform the Fast Fourier Transform (FFT).

The A/D converter 24a is responsive to the start signal C2 to convert the beat signal B1 into the digital signal D1 at regular intervals and store it in given memory locations of the RAM 26c. After completion of a given number of A/D conversions, the A/D converter 24a sets a termination flag in the RAM 26c and stops operating.

When the triangular wave generator 22 outputs the modulating signal Sm to the voltage-controlled oscillator 12b through the modulator 12a, the voltage-controlled oscillator 12b produces a radar output signal (also referred to as a transmit signal below) whose frequency increases in a cycle at a given rate in a range (i.e., the modulated frequency-rising range) wherein the modulating signal Sm in the form of a triangular wave rises in level and decreases in a cycle at a given rate in a following range (i.e., the modulated frequency-falling range) wherein the modulating signal Sm falls in level.

The FM-CW radar 2 has a known scan mechanism (not shown) which swings the transmitting antenna 12e and the receiving antenna 14a horizontally in the radar detectable range. The invention is, however, not limited to this structure and may alternatively be used with a phase difference monopulse radar structure in which a plurality of receiving antennas are used to determine the angular direction of a target based on the phase difference between radar output signals received through the receiving antennas. U.S. Pat. No. 5,731,778 assigned to the same assignee as that of this application teaches such a radar structure, disclosure of which is incorporated herein by reference.

The FM-CW radar 2 also includes a vehicle speed sensor (not shown) which outputs a vehicle speed signal to the microcomputer 26. The vehicle speed sensor has a known structure designed to measure the speed of a crankshaft of an engine and provides a signal indicative thereof as the vehicle speed signal.

Figure 2:
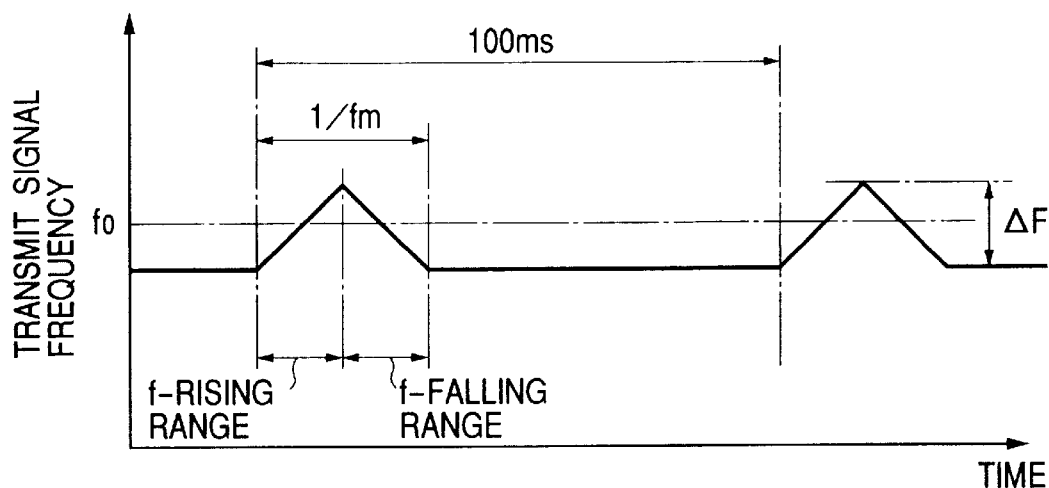
FIG. 2 is a graph which shows a variation in frequency of a radar wave.

FIG. 2 shows a variation in frequency of the radar output signal.

The frequency of the radar output signal is modulated with the modulating signal Sm so that it may increase and decrease by $\Delta F$ in a range of $1/fm$ cyclically The central frequency of the radar output signal in the range of $1/fm$ will be defined as f0 below. In this embodiment, the cycle in which the radar output signal is modulated is set to 100 ms because an obstacle detection program, as will be discussed later, is executed at regular intervals of 100 ms, and the start signal C1 is outputted in each program cycle.

Figure 4A:
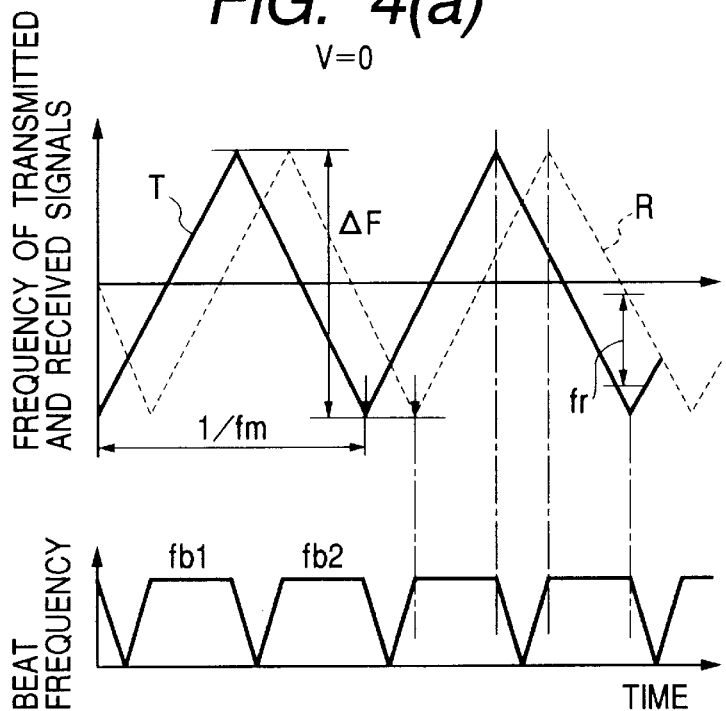
FIG. 4(a) is a graph which shows frequencies of transmitted and received signals and a beat signal when the relative speed of a target is substantially zero.
Figure 4B:
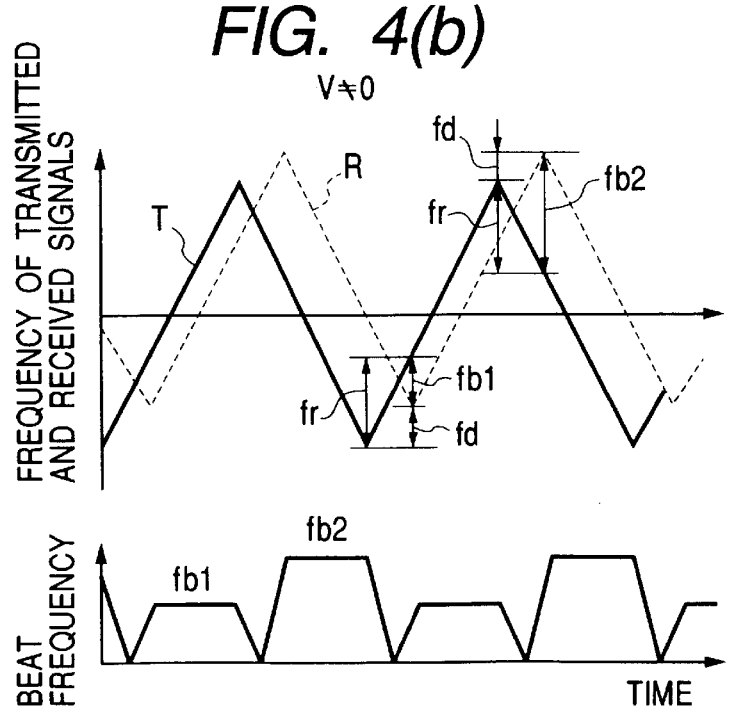
FIG. 4(b) is a graph which shows frequencies of transmitted and received signals and a beat signal when the relative speed of a target is not zero.

The transmitter 12 radiates a radar wave produced by the radar output signal modulated with the modulating signal Sm. If a reflective object is present in the radar detection zone, the receiver 14 receives a return of the radar wave from the object through the receiving antenna 14a and mixes it with the radar output signal inputted from the transmitter 12 to produce the beat signal B1. The return of the radar wave, or signal received by the receiver 14 usually undergoes a delay of time the radar wave takes to travel from the transmitter 12 to the object and back and is also doppler-shifted in frequency if the object is moving relative to the radar 2. The beat signal B1, thus, contains, as shown in FIG. 4(b), a time-delayed component and a doppler-shifted component fd.

Figure 3:
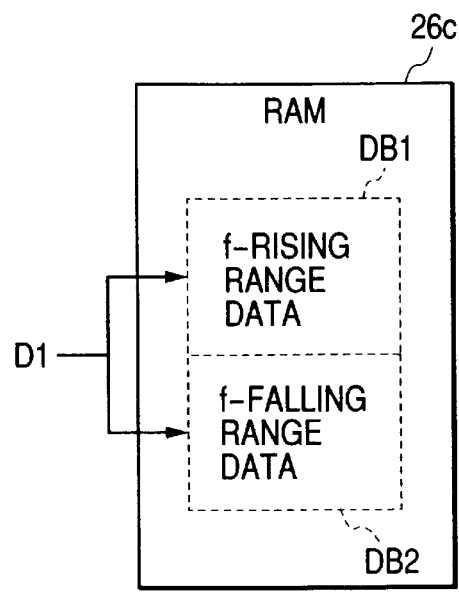
FIG. 3 is an illustration which shows storage locations of a RAM in a radar wherein frequency components derived by beat signals are stored.

The A/D converter 24a converts the beat signal B1, in sequence, into the digital signals D1. The digital signals D1 are, as shown in FIG. 3, stored in memory locations or data blocks DB1 and DB2 of the RAM 26c. Specifically, the A/D converter 24a operates upon activation of the triangular wave generator 22 and performs a given number of A-D conversions during output of the modulating signal Sm. The first half of the digital signals D1 produced by the A/D converter 24a in the modulated frequency-rising range are stored in the data block DB1, while the second half of the digital signals D1 in the modulated frequency-falling range are stored in the data block DB2. The digital signals D1 thus stored in the RAM 26c are processed in the arithmetic processing unit 28 and the microcomputer 26 to identify obstacles in the radar detection zone.

FIG. 5 shows a program or logical steps performed by the microcomputer 26 at regular intervals of 100 ms to detect obstacles in the radar detection zone.

After entering the program, the routine proceeds to step 100 wherein the transmitter 12 transmits a frequency-modulated radar wave, the receiver 14 receives a return of the radar wave to produce the beat signal B1, and the A/D converter 24a converts the beat signal B1 into the digital signals D1 and stores them in the RAM 26c.

The routine proceeds to step 110 wherein the data blocks DB1 and DB2 of the RAM 26c are selected alternately, and data in each data block DB1 and DB2 is inputted to the arithmetic processing unit 28 to perform FFT (fast Fourier transform) thereon to produce a complex vector for each frequency. The data inputted to the arithmetic processing unit 28 is subjected to the known window processing using a Hanning window or a triangular windows for restricting side lobes appearing in the operation of FFT.

The routine proceeds to step 120 wherein based on absolute values of the complex vectors, that is, amplitudes of frequency components indicated by the complex vectors, all frequency components (also referred to as peak frequency components below) showing peaks (also referred to as spectrum peaks below) of the frequency spectrum are found. The determination of each peak frequency component may be achieved by monitoring a variation in amplitude of each frequency component in time sequence to determine a frequency at which the variation in amplitude is reversed in sign.

Figure 7A:
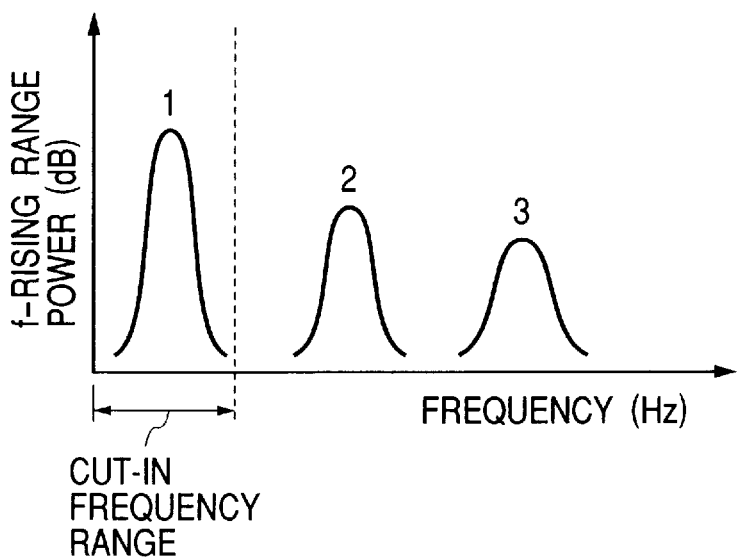
FIG. 7(a) illustrates a spectrum in a modulated frequency-rising range.
Figure 7B:
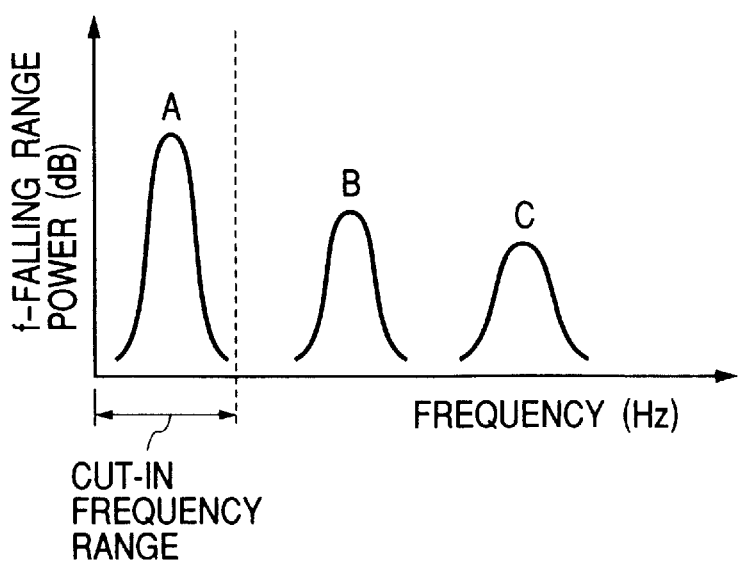
FIG. 7(b) illustrates a spectrum in a modulated frequency-falling range.
Figures 8, 9:
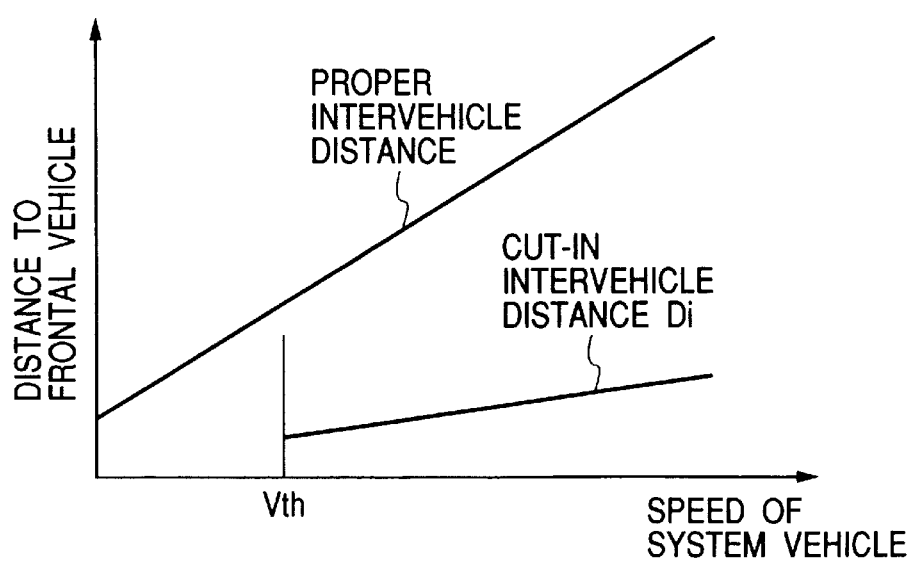
FIG. 8 illustrates a table listing all possible combinations of peak frequency components in a modulated frequency-rising and -falling ranges.
FIG. 9 is a map used to determine a cut-in intervehicle distance.

The routine proceeds to step 130 wherein a peak frequency combination list is made which lists all possible combinations of the peak frequency components in the modulated frequency-rising and -falling ranges. If there are, as shown in FIGS. 7(a) and 7(b), three peak frequency components in each of the modulated frequency-rising and -falling ranges, numbers 1, 2, and 3 are assigned to the peak frequency components in the modulated frequency-rising range from the lower frequency side, and symbols A, B, and C are assigned to the peak frequency components in the modulated frequency-falling range from the lower frequency side to make nine frequency combinations, as shown in FIG. 8.

After the frequency combination list is prepared, the routine proceeds to step 140 wherein it is determined whether data in all the combinations of the frequency combination list have been processed or not, that is, whether the distance to and relative speed of a target have been derived using each of the combinations of the frequency combination list or not. The determination of the distances to and relative speeds of the target in each program cycle (i.e., 100 ms) is made from lower frequency combinations such as 1-A, 1-B, 1-C, . . . in a program, as discussed below in detail.

Figure 6:
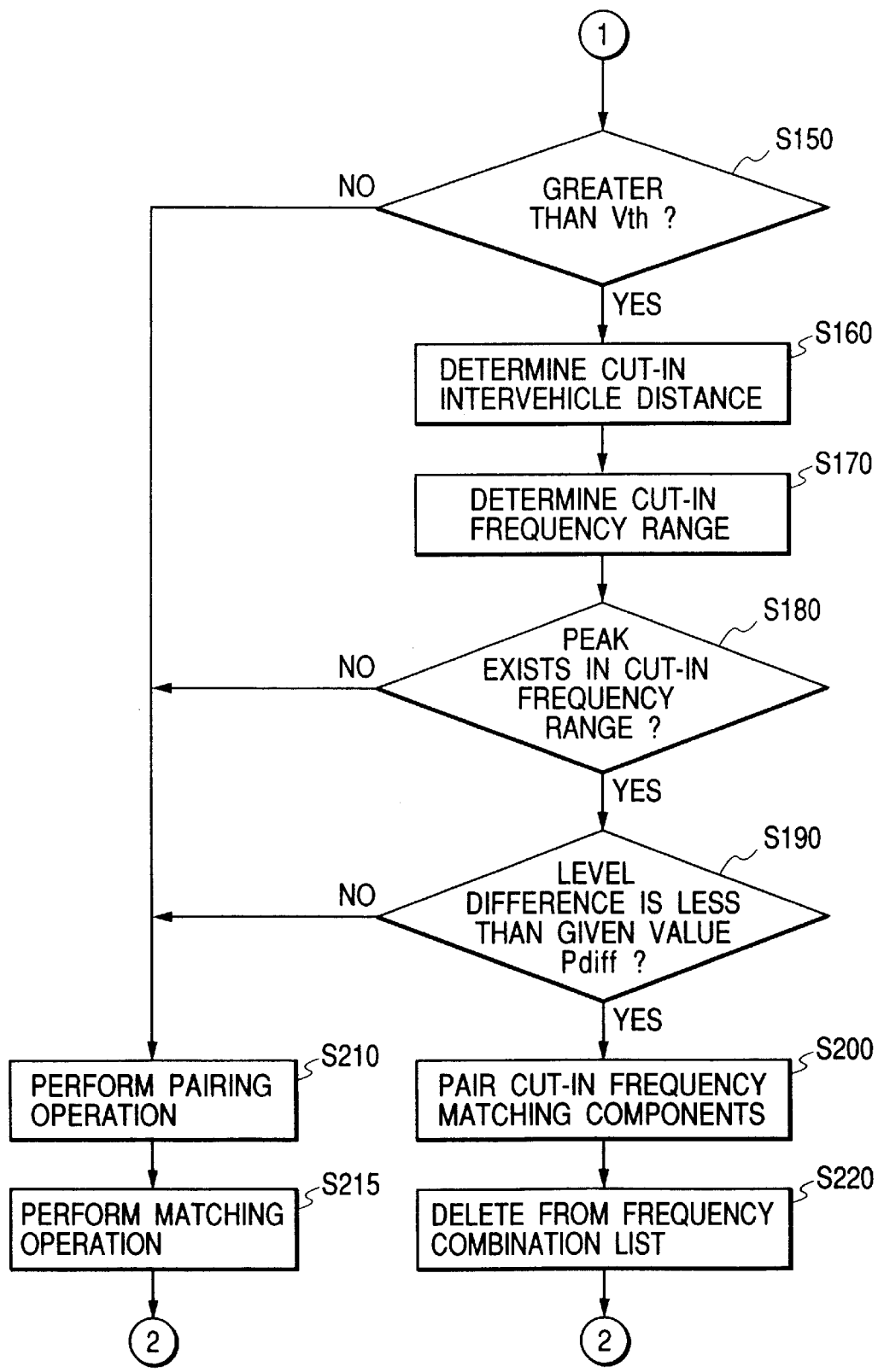

If a NO answer is obtained in step 140 meaning that all the frequency combinations are not yet processed, then the routine proceeds to step 150, as shown in FIG. 6.

In step 150, it is determined whether the speed of the system vehicle is greater than a given speed Vth or not which should initiate a cut-in frequency matching pair producing operation, as will be discussed in detail later. This determination is made for avoiding the drawback that when the vehicle speed is low, many targets are usually detected in a lower frequency range as compared with when the vehicle speed is high, so that a plurality of frequency peaks may appear in a cut-in frequency range, as will be described later in detail and for the reason that when an object is cut suddenly in front of the system vehicle during traveling at a lower speed, it is possible to identify the object in a typical peak frequency pair specifying manner without performing the cut-in frequency matching pair producing operation.

If a YES answer is obtained in step 150, then the routine proceeds to step 160 wherein a cut-in intervehicle distance Di is set. The cut-in intervehicle distance Di is a distance from the system vehicle within which only one vehicle is allowed to run, that is, in a case where only one pair of peak frequency components in the modulated frequency-rising and -falling ranges is allowed to fall in the cut-in frequency range. The determination of the cut-in intervehicle distance Di is accomplished by look-up using a map, as shown in FIG. 9, stored in the microcomputer 26 which defines the cut-in intervehicle distance Di as functions of the speed of the system vehicle and the distance to a vehicle traveling ahead of the system vehicle.

The cut-in intervehicle distance Di as can be seen from FIG. 9, is decreased as the speed of the system vehicle is decreased, thereby avoiding object identifying errors caused by detection of a plurality of objects other than a vehicle cutting in front of the system vehicle and increased as the speed of the system vehicle is increased, thereby widening the radar detection zone for speeding up the detection of a target. The cut-in intervehicle distance Di is, however, set below a space within which only one vehicle is allowed to exist in front of the system vehicle.

The routine proceeds to step 170 wherein the cut-in frequency range Fi, as shown in FIGS. 7(a) and 7(b), is determined as a function of the cut-in intervehicle distance Di for each of the modulated frequency-rising and -falling ranges. The cut-in frequency range Fi is a lower frequency range within which there is no peak when the system vehicle is traveling in normal conditions, but a peak appears when a dangerous condition is encountered such as when a vehicle has nipped suddenly in front of the system vehicle.

The cut-in frequency range Fi may be determined according to equation (3) below.

$$Fi = (8 \Delta F \cdot fm \cdot Di)/2C \quad (3)$$

In the above described Eq. (1), when the relative speed of the system vehicle to an object is zero (0), fb1 will be equal to fb2. Eq. (3) is derived by setting fb1 equal to fb2 in Eq. (1).

The routine proceeds to step 180 wherein it is determined whether the peak frequency components derived in step 120 fall within the cut-in frequency range or not. Taking as an example a combination 1-A of the peak frequency component 1 in the modulated frequency-rising range and the peak frequency component A in the modulated frequency-falling range put on the frequency combination list made in step 130, both the peak frequency components 1 and A lie within the cut-in frequency range Fi. In this case, a YES answer is obtained in step 180, and the routine proceeds to step 190.

In step 190, it is determined whether a difference in level between the peak frequency components in the modulated frequency-rising and -falling ranges selected in step 180 is less than or equal to a given value Pdiff or not. This determination is made for preventing the peak frequency components from being paired in the following step when the level difference therebetween is greater than the given value Pdiff because the peak frequency components in the modulated frequency-rising and -falling ranges usually do not arise from the same target in such a condition.

If a YES answer is obtained, then the routine proceeds to step 200 wherein the cut-in frequency matching pair producing operation is performed. The cut-in frequency matching pair producing operation is to combine the peak frequency components in the modulated frequency-rising and -falling ranges which lie within the cut-in frequency range Fi to produce a peak frequency pair for use in determining the distance to and relative speed of a target in preference to the other frequency components.

The routine proceeds to step 220 wherein the combinations on the frequency combination list each containing either or both of the peak frequency components paired in step 200 are deleted.

For example, when the peak frequency components of the combination 1-A on the frequency combination list in FIG. 8 are paired in step 200, five combinations: the combinations 1-A, 1-B, and 1-C containing the peak frequency component 1 in the modulated frequency-rising range and the combinations 2-A and 3-A containing the peak frequency component A in the modulated frequency-falling range are deleted from the frequency combination list.

After step 220, the routine returns back to step 140 in FIG. 5 and determines whether all the combinations of the frequency combination list have been used in determining the distance to and relative speed of a target or not.

In the example wherein the peak frequency components of the combination 1-A are paired in step 200, and the combinations 1-A, 1-B, 1-C, 2-A, and 3-A are deleted from the frequency combination list in step 220, the combination 2-B is subsequently selected and subjected to the operations in steps 150 to 210. In this case, a NO answer is obtained in step 180, and the routine proceeds to step 210 wherein a pairing operation, as taught in U.S. Pat. No. 5,619,208, is performed to determine the distance to and relative speed of a target, which will be described in detail below.

In a case where a plurality of objects are moving at the same speed, the distances Dt to and relative speeds Vt of the objects a given time ΔT later may be determined simultaneously according to equations 4 and 5 below.

$$Dt = D + V \cdot \Delta T \quad (4)$$

$$Vt = V \quad (5)$$

where D and V represent left members of Eqs. (1) and (2), respectively.

In step 210, each of the peak frequency pairs produced in step 130 is substituted into Eqs. (1) and (2) to determine the distance D to and relative speed V of one of the objects. The distance D and relative speed V are substituted into Eqs. (4) and (5) to determine the distance Dt to and relative speed Vt of the object the given time ΔT later. By substituting the thus determined Dt and Vt into D and V in Eqs. (1) and (2), we obtain simultaneous equations for estimating peak frequency components in the modulated frequency-rising and -falling ranges which are expected to appear at the given time ΔT later. Specifically, a currently determined pair of peak frequency components in the modulated frequency-rising and -falling ranges is used to estimate a pair of peak frequency components which are expected to appear at the given time ΔT later.

After the peak frequency component pair is estimated in step 210, the routine proceeds to step 215. Alternatively, if a NO answer is obtained in step 150, 180, or 190, the routine proceeds to step 215.

In step 215, it is determined whether the peak frequency component pair estimated in step 210 is a correct one or not. This determination is made in a program cycle performed after the given time ΔT by determining whether the estimated peak frequency component pair matches up with or is close to a pair of peak frequency components in the modulate frequency-rising and Δ-falling ranges which has derived by the frequency analysis of the beat signal actually after a lapse of the given time ΔT, that is, whether the estimated peak frequency pair and the actually derive peak frequency component pair both fall within a given narrow frequency range or not. In the above described example wherein the combination 2-B is selected, and a NO answer is obtained in step 180, if there is a pair of peak frequency components estimated the given time ΔT earlier, it is determined whether the combination 2-B is identical with or is close to the estimated pair of peak frequency components. If a YES answer is obtained meaning that the peak frequency components of the combination 2-B have arisen from the same target as that used to estimate the pair of peak frequency components the given time ΔT earlier, the combination 2-B is used to determine the distance to and relative speed of the target.

After the pair matching operation in step 215 is performed on the combination 2-B, the routine returns back to step 140 to select the combination 2-C and subjects it to the operations in steps 150 to 210. Specifically, a series of steps 140 to 210 is repeated until all the data on the frequency combination list are processed.

If it is determined in step 140 that the distances to and relative speeds of the targets have been determined using all the combinations on the frequency combination list, the routine proceeds to step 230 wherein the data on all the targets are outputted to an external device. However, when the cut-in frequency matching pair producing operation is performed in step 200, only the data derived using the cut-in frequency matching frequency pair is outputted, while the data derived using the peak frequency components lying out of the cut-in frequency range Fi are not outputted. Specifically, when the pairing operation is performed in step 210 after the cut-in frequency matching pair producing operation is performed in step 200, it is determined whether one combination selected from the frequency combination list is identical or close to a corresponding one of the peak frequency pairs which were estimated previously and stored in the RAM 26c of the microcomputer 26, and a result of this determination is stored in the RAM 26c without being outputted.

At the same time as the data on the targets are outputted in step 230, a warning signal may also be outputted as needed.

As can be seen from the above discussion, the FW-CW radar 2 of the invention is designed to set the cut-in frequency range Fi as a function of the cut-in intervehicle distance Di and use peak frequency components if lying within the cut-in frequency range Fi to determine the distance to and relative speed of an object which may be identified as a vehicle nipping in front of the system vehicle suddenly. The conventional radar system, as taught in the introductory part of this application, consumes approximately 300 ms. in identifying an object using newly appearing peak frequency components, but the FM-CW radar 2 of the invention does not perform the pair matching operation in step 215 when the peak frequency component appears in the cut-in frequency range Fi, and the cut-in frequency matching pair producing operation is performed in step 200 and, thus, consumes approximately 100 ms. in identifying an object which is one-thirds of the time required by the conventional radar system.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An FM-CW radar apparatus for a vehicle comprising:

a radar wave transmitter transmitting a radar wave having a frequency modulated so as to increase at a given rate and decrease at a given rate cyclically;

a radar wave receiver receiving a return of the radar wave from a target object present in a radar detection zone to mix the return of the radar wave with the radar wave transmitted from said radar wave transmitter to produce a beat signal;

a peak frequency component producing circuit analyzing the beat signal in frequency to produce peak frequency components in a modulated frequency-rising range wherein the frequency of the radar wave transmitted from said radar wave transmitter increases and a modulated frequency-falling range wherein the frequency of the radar wave decreases; and a radar data producing circuit producing radar data, if one of peak frequency pairs, each of which is made up of each of the peak frequency components in the modulated frequency-rising range and one of the peak frequency components in the modulated frequency-falling range, lies within a given lower frequency range, said radar producing circuit identifying the one of the peak frequency pairs as the radar data arising from a moving object appearing suddenly in the radar detection zone.

2. An FM-CW radar apparatus as set forth in claim 1, wherein said radar data producing circuit uses each of the peak frequency pairs to estimate a peak frequency pair cyclically which is expected to appear a given time later and, if the estimated peak frequency pair and a corresponding peak frequency pair which has derived actually the given time later are close to each other within a given frequency range, determines the estimated peak frequency pair and the corresponding peak frequency pair as arising from the same object.

3. An FM-CW radar apparatus as set forth in claim 2, wherein when the peak frequency pair lying within the given lower frequency range has been detected, said radar data producing circuit removes some of the peak frequency pairs containing at least one of the peak frequency components of the peak frequency pair lying within the given lower frequency range and uses only the remaining peak frequency pairs to estimate peak frequency pairs which are expected to appear at the given time later.

4. An FM-CW radar apparatus as set forth in claim 1, wherein the given lower frequency range is so set that the only one pair of peak frequency component is allowed to be fall within the given lower frequency range.

5. An FM-CW radar apparatus as set forth in claim 1, wherein the given lower frequency range is set as a function of a speed of the FM-CW radar apparatus.

6. An FM-CW radar apparatus as set forth in claim 1, wherein the given lower frequency range is provided when a speed of the FM-CW radar is greater than a given value.

7. An FM-CW radar apparatus as set forth in claim 2, wherein when a difference in level between one of the peak frequency components in the modulated frequency-rising range and one of the peak frequency components in the modulated frequency-falling range is smaller than a given value, said radar data producing circuit combines them to produce one of the peak frequency pairs.

8. An FM-CW radar apparatus for a vehicle comprising:

a radar wave transmitter transmitting a radar wave having a frequency modulated so as to increase at a given rate and decrease at a given rate cyclically;

a radar wave receiver receiving a return of the radar wave from a target object present in a radar detection zone to mix the return of the radar wave with the radar wave transmitted from said radar wave transmitter to produce a beat signal;

a peak frequency component producing circuit analyzing the beat signal in frequency to produce peak frequency components in a modulated frequency-rising range wherein the frequency of the radar wave transmitted from said radar wave transmitter increases and a modulated frequency-falling range wherein the frequency of the radar wave decreases;

a combining circuit combining each of the peak frequency components in the modulated frequency-rising range with one of the peak frequency components in the modulated frequency-falling range to produce a peak frequency pair; and a radar data outputting circuit, if one of the peak frequency pairs lies within a given lower frequency range, outputting only the one of the peak frequency pairs as radar data.

* * * * *